US009341399B2

(12) United States Patent
Zhan et al.

(10) Patent No.: US 9,341,399 B2
(45) Date of Patent: May 17, 2016

(54) ELECTRONIC EXPANSION VALVE (75) Inventors: Caiyi Zhan, Zhejiang (CN); Ze Yuan, Zhejiang (CN)

(73) Assignee: Zhejiang Sanhua Co., Ltd., Zhejiang (CN)

( * ) Notice: Subject to any disclaimer, the term of this patent is extended or adjusted under 35 U.S.C. 154(b) by 0 days.

(21) Appl. No.: 14/401,484

(22) PCT Filed: Aug. 10, 2012

(86) PCT No.: PCT/CN2012/079932
§ 371 (c)(1),
(2), (4) Date: Nov. 14, 2014

(87) PCT Pub. No.: WO2013/177865
PCT Pub. Date: Dec. 5, 2013

(65) Prior Publication Data
US 2015/0129067 A1    May 14, 2015

(30) Foreign Application Priority Data

May 29, 2012   (CN) .......................... 2012 1 0176799

(51) Int. Cl.
*F16K 17/26*    (2006.01)
*F25B 41/06*    (2006.01)
(Continued)

(52) U.S. Cl.
CPC .............. *F25B 41/062* (2013.01); *F16K 3/246* (2013.01); *F16K 47/08* (2013.01); *F25B 2341/065* (2013.01); *Y02B 30/72* (2013.01); *Y10T 137/88022* (2015.04)

(58) Field of Classification Search
CPC .. F25B 41/062; F25B 2341/065; F16K 3/246; F16K 47/08; Y10T 137/88022; Y02B 30/72
See application file for complete search history.

(56) References Cited

U.S. PATENT DOCUMENTS 2,345,306 A      3/1944  Van Der Werff
5,669,413 A  *   9/1997  Hegglin ................ F25B 41/062
                                                         137/554
(Continued)

FOREIGN PATENT DOCUMENTS

CN    1132328 A    10/1996
CN    1297518 A     5/2001
(Continued)

OTHER PUBLICATIONS

International Search Report dated Feb. 28, 2013 from corresponding International Application No. PCT/CN2012/079932.
(Continued)

*Primary Examiner* — Jessica Cahill
(74) *Attorney, Agent, or Firm* — Wolf, Greenfield & Sacks, P.C.

(57) ABSTRACT

An electronic expansion valve is provided, a sleeve is fixed in a main valve cavity of the electronic expansion valve, and a valve core seat is axially movably provided in the sleeve; a circumferential side wall of the sleeve is provided with a sleeve flow passage, and a circumferential side wall of the valve core seat is provided with a valve core seat side hole; and when the refrigerant flows forward, the valve core seat closes the main valve port to disconnect a communication between the sleeve flow passage and the valve core seat side hole, and the refrigerant flows to the valve core valve port through the sleeve flow passage; and when the refrigerant flows reversely, the valve core seat moves upward to open the main valve port to communicate the valve core seat side hole with the sleeve flow passage.

20 Claims, 11 Drawing Sheets (51) Int. Cl.
*F16K 3/24* (2006.01)
*F16K 47/08* (2006.01)

(56) References Cited

U.S. PATENT DOCUMENTS

| | | | |
|---|---|---|---|
| 2005/0034770 A1* | 2/2005 | Stares | F16K 3/246 137/625.3 |
| 2009/0293520 A1 | 12/2009 | Hayashi et al. | |
| 2011/0012038 A1* | 1/2011 | Lv | F16K 31/047 251/129.01 |
| 2011/0084224 A1* | 4/2011 | Zhan | F25B 41/062 251/129.01 |
| 2011/0120161 A1* | 5/2011 | Hayashi | F25B 41/062 62/160 |

FOREIGN PATENT DOCUMENTS

| | | | | |
|---|---|---|---|---|
| CN | 1504668 | A | 6/2004 | |
| CN | 200968423 | Y | 10/2007 | |
| CN | 201318457 | Y | 9/2009 | |
| CN | 201327255 | Y | 10/2009 | |
| CN | 102042416 | A | 5/2011 | |
| CN | 102252119 | A | 11/2011 | |
| CN | 202182593 | U | 4/2012 | |
| GB | 1279753 | A * | 6/1972 | F16K 3/246 |
| JP | 4285155 | B2 | 4/2009 | |
| JP | A 2009287913 | A | 12/2009 | |
| JP | 2012047213 | A | 3/2012 | |
| KR | 100552942 | B1 | 2/2006 | |

OTHER PUBLICATIONS

International Search Report dated Feb. 28, 2013 from potentially related International Application No. PCT/CN2012/079933.
International Search Report dated Feb. 28, 2013 from potentially related International Application No. PCT/CN2012/079927.
International Search Report dated Feb. 28, 2013 from potentially related International Application No. PCT/CN2012/079930.
Chinese Office Action and English summary, dated Dec. 30, 2015, from corresponding Chinese Application No. 201210176799.0.

* cited by examiner

Fig. 1

Prior Art

Fig. 2

Prior Art

Fig. 3

Prior Art

ELECTRONIC EXPANSION VALVE

The present application the national phase International Application No. PCT/CN2012/079932, filed on Aug. 10, 2012, which claims the benefit of priority to Chinese Patent Application No. 201210176799.0, entitled "ELECTRONIC EXPANSION VALVE", filed with the Chinese State Intellectual Property Office on May 29, 2012, the entire disclosures of both applications are incorporated herein by reference.

TECHNICAL FIELD

The present application relates to the technical field of fluid control components, and particularly to an electronic expansion valve.

BACKGROUND

Figure 1:
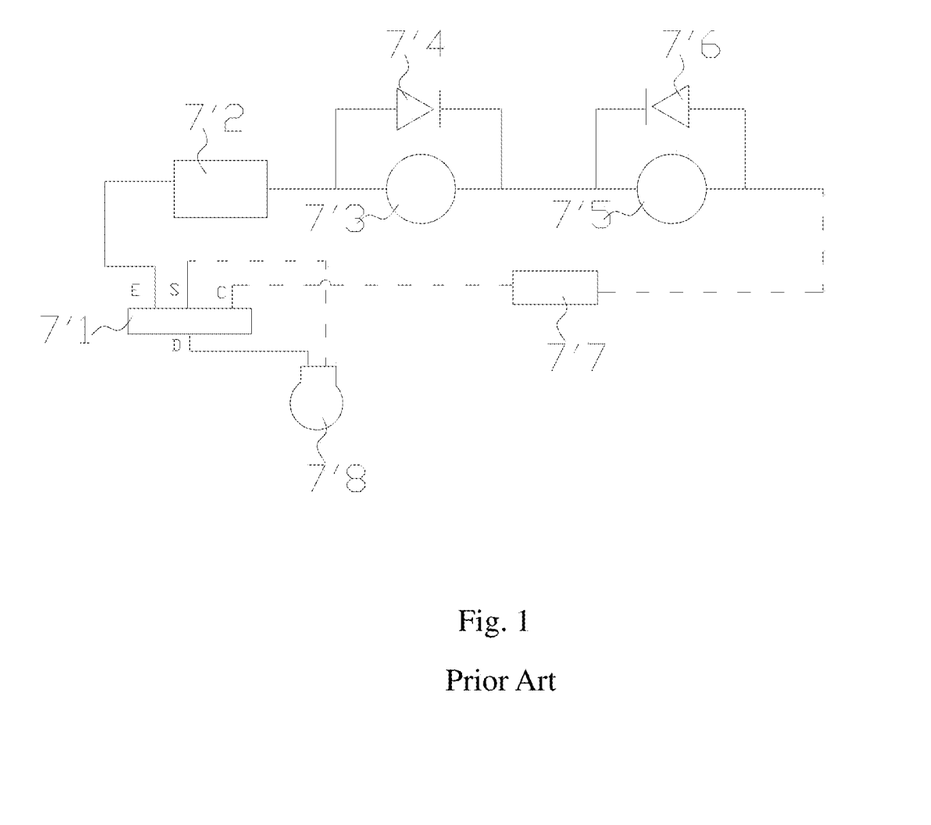
FIG. 1 is a schematic view showing the operating principle of an air conditioning refrigerating system in the conventional technology.

In the air conditioner market, two electronic expansion valves are employed since an indoor unit is disposed far away from an outdoor unit of an air conditioner. In addition, each of the two electronic expansion valves is required to be connected to a respective one-way valve in parallel to improve the system efficiency to the greatest extent. The schematic diagram of the system of the air conditioner is shown in FIG. 1, and the working principle is briefly described as follows The refrigerating operation is described as follows. Gaseous refrigerant with high temperature and high pressure which is discharged from a gas discharge pipe of a compressor 7'8 passes through, in turn, a connecting pipe D and a connecting pipe E of a four-way valve 7'1, an outdoor heat exchanger 7'2 (releasing heat by condensation), a first one-way valve 7'4 (here, a first electronic expansion valve 7'3 does not function to regulate the flow), and a second electronic expansion valve 7'5 (here, a second one-way valve 7'6 is closed, and the second electronic expansion valve 7'5 functions to regulate the flow), and finally enters into an indoor heat exchanger 7'7 to be evaporated, so as to absorb heat to realize the refrigerating function. Here, the second electronic expansion valve 7'6 is close to the indoor heat exchanger 7'7, thus the heat loss may be reduced (if the electronic expansion valve is too far away from the evaporator, the liquid refrigerant with low temperature and low pressure which is discharged from the electronic expansion valve is apt to be gasified, which not only causes heat loss, but also results in significant reduction of the utilization rate of the evaporator). Also, if the refrigerant with medium temperature and high pressure which is discharged from the outdoor heat exchanger 7'2 passes through the first electronic expansion valve 7'3, a throttling effect may still occur even when the expansion valve is fully opened, which reduces the pressure of the refrigerant, and then when the refrigerant is transferred to the second electronic expansion valve 7'5, it is apt to be gasified partly, therefore the throttling effect of the electronic expansion valve is adversely affected, and the system efficiency is reduced.

The heating operation is described as follows. Gaseous refrigerant with high temperature and high pressure which is discharged from the gas discharge pipe of the compressor 7'8 passes through, in turn, the connecting pipe D and a connecting pipe C of the four-way valve 7'1, the indoor heat exchanger 7'7 (releasing heat by condensation), the second one-way valve 7'6 (here, the second electronic expansion valve 7'5 does not function to regulate the flow), the first electronic expansion valve 7'3 (here, the first one-way valve 7'4 is closed, and the first electronic expansion valve 7'3 functions to regulate the flow), and finally enters into the outdoor heat exchanger 7'2 to be evaporated, so as to absorb heat to realize the refrigerating function. Here, the first electronic expansion valve 7'3 is close to the outdoor heat exchanger 7'2, thus the heat loss may be reduced (if the electronic expansion valve is too far away from the evaporator, the liquid refrigerant with low temperature and low pressure which is discharged from the electronic expansion valve is apt to be gasified, which not only causes heat loss, but also results in significant reduction of the utilization rate of the evaporator). Also, if the refrigerant with medium temperature and high pressure which is discharged from the indoor heat exchanger 7'7 passes through the second electronic expansion valve 7'5, the throttling effect may still occur even when the expansion valve is fully opened, which reduces the pressure of the refrigerant, and then when the refrigerant flows to the first electronic expansion valve 7'3, it is apt to be gasified partly, therefore the throttling effect of the electronic expansion valve is adversely affected, and the system efficiency is reduced.

However, in the current market, some customers require to integrate the one-way valve with the electronic expansion valve, so as to reduce the numbers of parts and solder joints, and to further improve the reliability of the system.

Figure 2:
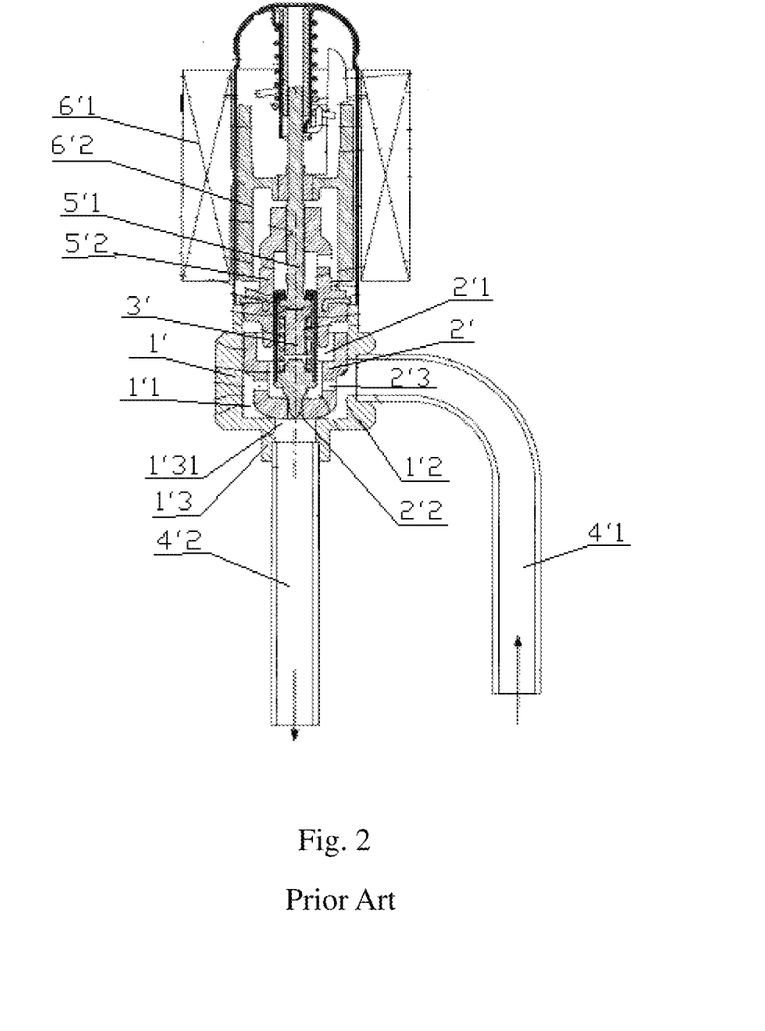
FIG. 2 is a schematic view showing the structure of an electronic expansion valve in the conventional technology which is performing a flow regulation when the refrigerant flows forwards.
Figure 3:
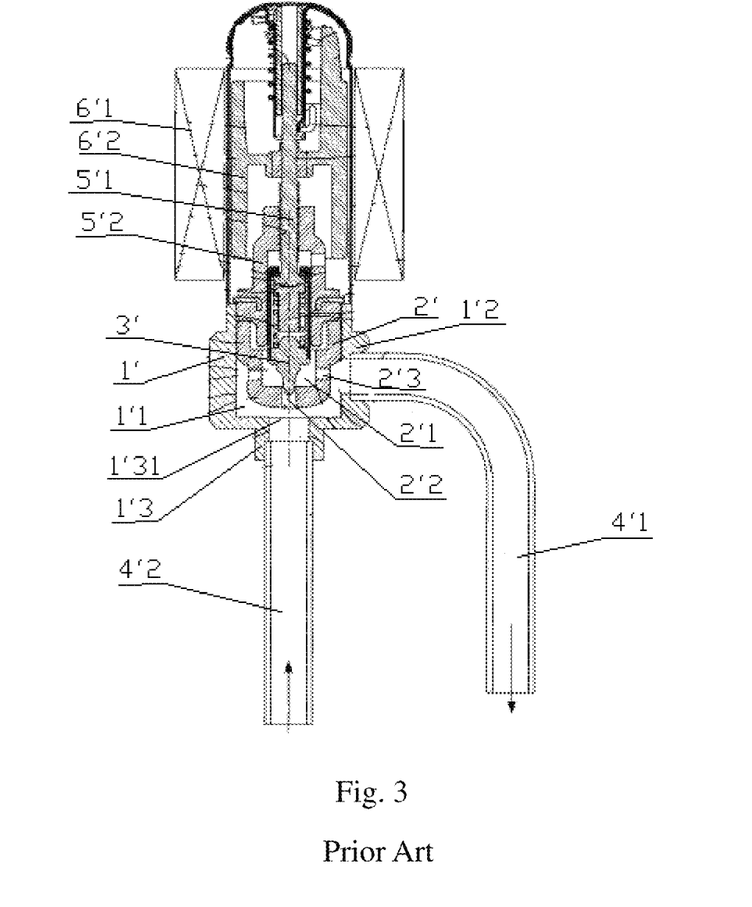
FIG. 3 is a schematic view showing the structure of the electronic expansion valve in the conventional technology, wherein the electronic expansion valve is opened when the refrigerant flows reversely.

In view of this, in the conventional technology, an electronic expansion valve with function of a one-way valve is disclosed in Japanese Patent Application Publication No. 2009-287913. Reference may be made to FIGS. 2 and 3. FIG. 2 is a schematic view showing the structure of an electronic expansion valve in the conventional technology which is performing a flow regulation when the refrigerant flows forwards; and FIG. 3 is a schematic view showing the structure of the electronic expansion valve in the conventional technology, wherein the electronic expansion valve is opened when the refrigerant flows reversely.

As shown in FIGS. 2 and 3, the electronic expansion valve in the conventional technology includes a valve seat 1'. The valve seat 1' is provided with a main valve cavity 1'1, a transverse connecting port 1'2 and a vertical connecting port 1'3, and an opening at an upper end of the vertical connecting port 1'3 forms a main valve port 1'31. A valve core seat 2' is provided inside the main valve cavity 1'1, and a circumferential side wall of the valve core seat 2' abuts against an inner circumferential side wall of the main valve cavity 1'1, thus the valve core seat 2' is guided by the main valve cavity 1'1 and may reciprocate along an axial direction of the main valve cavity 1'1, so as to open or close the main valve port 1'31. Further, as shown in FIGS. 2 and 3, the valve core seat 2' is provided with a secondary valve cavity 2'1, and a valve core valve port 2'2 in communication with the secondary valve cavity 2'1, and a valve needle component 3' extends into the secondary valve cavity 2'1 and reciprocates along an axial direction of the secondary valve cavity 2'1, so as to open or close the calve core valve port 2'2. Furthermore, as shown in FIGS. 2 and 3, the circumferential side wall of the valve core seat 2' is further provided with a communicating hole 2'3 in communication with the secondary valve cavity 2'1, and the communicating hole 2'3 faces the transverse connecting port 1'2, to allow the secondary valve cavity 2'1 to communicate with the transverse connecting port 1'2.

In addition, as shown in FIGS. 2 and 3, the transverse connecting port 1'2 is connected to a transverse connecting pipe 4'1, and the vertical connecting port 1'3 is connected to a vertical connecting pipe 4'2. The flow of the refrigerant fluid from the transverse connecting pipe 4'1 to the vertical connecting pipe 4'2 (i.e., a side of the transverse connecting port 1'2 is a high pressure zone, and a side of the vertical connecting port 1'3 is a low pressure zone) is defined as a forward flow, and the flow of the refrigerant fluid from the vertical connecting pipe 1'3 to the transverse connecting pipe 1'2 (i.e., the side of the vertical connecting port 1'3 is a high pressure zone, and the side of the transverse connecting port 1'2 is a low pressure zone) is defined as a reverse flow. The valve needle component 3' is connected to a screw rod 5'1, and the screw rod 5'1 cooperates with a nut 5'2 by screw threads. In such structure, a magnet 6'2 is rotated under the action of a magnetic field of a coil 6'1; and then the screw rod 5'1 is rotated and axially reciprocates due to the screw-thread fit with the nut 5'2, thereby driving the valve needle component 3' to reciprocate axially to open and close the valve bore valve port 2'2.

As shown in FIG. 2, when the refrigerant flows forward, the side of the transverse connecting port 1'2 is the high pressure zone, and the side of the vertical connecting port 1'3 is the low pressure zone. The valve core seat 2' moves downward under the action of a pressure difference of the refrigerant, thereby closing the main valve port 1'31. On this basis, the refrigerant enters into the secondary valve cavity 2'1 from the transverse connecting port 1'2 through the communicating hole 2'3, the valve needle component 3' opens the valve core valve port 2'2, and the refrigerant entered into the secondary valve cavity 2'1 flows to the vertical connecting port 1'3 via the valve core valve port 2'2, and in turn flows into the vertical connecting pipe 4'2. In this operation, the screw rod 5'1 moves axially to allow the valve needle component 3' to regulate an opening of the valve core valve port 2'2, thereby achieving an object of flow regulation of the electronic expansion valve.

As shown in FIG. 3, when the refrigerant flows reversely, the side of the vertical connecting port 1'3 is the high pressure zone, and the side of the transverse connecting port 1'2 is the low pressure zone. Here, the valve core seat 2' is pushed to move upward under the action of the pressure difference of the refrigerant, thereby opening the main valve port 1'31. The refrigerant flows through the main valve port 1'31, the main valve cavity 1'1 and the transverse connecting port 1'2 to the transverse connecting pipe 4'1, thereby achieving the function of one-way communication of the one-way valve.

However, the above electronic expansion valve in the conventional technology has the following defects.

As shown in FIG. 2, when the refrigerant flows forward, the side wall of the valve core seat 2' faces the transverse connecting port 1'2, thus the circumferential side wall of the valve core seat 2' may be impacted by the refrigerant with high pressure. When the pressure of the refrigerant fluctuates, an eccentricity of the valve core seat 2' may be caused, thus the valve core seat 2' cannot tightly seal the main valve port 1'31, which causes a large internal leakage, and adversely affects the working performance of the system. Furthermore, the eccentricity of the valve core seat 2' may cause interference between the valve needle component 3' and the valve core valve port 2'2.

SUMMARY

One technical problem to be solved by the present application is to provide an electronic expansion valve. The structural design of the electronic expansion valve may prevent an excessive impact on a valve core seat caused by the refrigerant with high pressure when the refrigerant flows forward, thereby preventing the eccentricity of the valve core seat, and avoiding an internal leakage, and ensuring the reliability of the operation of the system.

In order to solve the above technical problem, an electronic expansion valve is provided according to the present application, which includes a valve seat, a vertical connecting pipe and a transverse connecting pipe, the valve seat being provided with a main valve cavity; wherein the electronic expansion valve further includes a main valve port in communication with the vertical connecting pipe and a valve core seat configured to open and close the main valve port, the valve core seat is provided with a valve core valve port which allows a communication with the vertical connecting pipe; and the electronic expansion valve further includes a valve needle component configured to open and close the valve core valve port; and the electronic expansion valve further includes a drive component for driving the valve needle component to move axially, and the drive component includes a screw rod and a nut which cooperates with the screw rod by screw threads; and in a case that refrigerant flows forwards, the valve core seat closes the main valve port, the refrigerant flows to the vertical connecting pipe through the valve core valve port, and the valve needle component is driven by the drive component to regulate an opening of the valve core valve port; and in a case that the refrigerant flows reversely, the valve core seat moves upward to open the main valve port, and the refrigerant flows to the transverse connecting pipe through the main valve port;

wherein a sleeve is fixed in the main valve cavity, the valve core seat is axially movably provided in the sleeve, and a lower portion of the valve needle component extends into the sleeve to open and close the valve core valve port; and a circumferential side wall of the sleeve is provided with a sleeve flow passage which allows a communication between an inner cavity of the sleeve and the main valve cavity; the valve core seat is provided with a valve core seat through hole in communication with the vertical connecting pipe, and an aperture at an upper end of the valve core seat through hole forms the valve core valve port, and a circumferential side wall of the valve core seat is provided with a valve core seat side hole in communication with the valve core seat through hole; and in a case that the refrigerant flows forward, the valve core seat closes the main valve port to disconnect a communication between the sleeve flow passage and the valve core seat side hole, and the refrigerant flows to the valve core valve port through the sleeve flow passage; and in a case that the refrigerant flows reversely, the valve core seat moves upward to open the main valve port to communicate the valve core seat side hole with the sleeve flow passage.

Preferably, a lower end of the sleeve is supported by the valve seat, an inner wall at a lower end of the sleeve forms a valve core seat guide hole, and an aperture at an upper portion of the valve core seat guide hole forms the main valve port.

Preferably, a vertical connecting port is provided in the valve seat, and the lower end of the sleeve extends out of the vertical connecting port and is supported by an inner wall of the vertical connecting port.

Preferably, the vertical connecting pipe is further mounted on a circumferential outer side wall of the lower end of the sleeve.

Preferably, a circumferential outer side wall of the valve core seat is provided with a valve core seat outer guide portion which is fit in the valve core seat guide hole and is guided by the valve core seat guide hole, and a top end of the valve core seat outer guide portion protrudes outwards to form a valve core seat sealing portion for opening and closing the main valve port.

Preferably, the valve core seat through hole includes a first axial hole in communication with the vertical connecting pipe and a second axial hole provided above the first axial hole, and an aperture at an upper end of the second axial hole forms the valve core valve port; and a flow area of the first axial hole is larger than a flow area of the second axial hole.

Preferably, the valve core seat side hole is provided in the circumferential side wall of the valve core seat at a position where the first axial hole is located, and is in communication with the first axial hole, and a total flow area of the valve core seat side hole is larger than the flow area of the first axial hole.

Preferably, the first axial hole and the second axial hole are further in communication with each other via a tapered hole.

Preferably, the sleeve is of an integral structure, and the sleeve flow passage is formed by a plurality of through holes provided in the circumferential side wall of the sleeve.

Preferably, an upper portion of the sleeve is provided with a nut inner guide hole, and the sleeve cooperates with a circumferential outer wall of a lower portion of the nut via the nut inner guide hole.

Preferably, the sleeve is of a separated structure, and includes a nut guide holder fixed on the inner side wall of the valve seat and a valve core seat fitting portion supported by a bottom wall of the valve seat; and a gap between the nut guide holder and the valve core seat fitting portion in an axial direction of the valve seat forms the sleeve flow passage.

Preferably, the nut guide holder is provided with a guide inner hole, and the lower portion of the nut is fit in the guide inner hole and is guided by the guide inner hole.

Preferably, a side wall of the guide holder is provided with a circumferential protrusion configured to cooperate with the inner side wall of the valve seat, and the circumferential protrusion is provided with a plurality of gaps which are configured to communicate a cavity above the circumferential protrusion and a cavity below the circumferential protrusion.

Preferably, a stroke of reciprocating motion of the valve core seat is smaller than a stroke of reciprocating motion of the valve needle component, and in an upward moving process of the valve core seat, the valve core seat is stopped when an upper end surface of the valve core seat abuts against a lower end surface of the nut.

On the basis of the conventional technology, in the electronic expansion valve according to the present application, a sleeve is fixed in the main valve cavity, the valve core seat is axially movably provided in the sleeve, and a lower portion of the valve needle component extends into the sleeve to open and close the valve core valve port. A circumferential side wall of the sleeve is provided with a sleeve flow passage which allows a communication between an inner cavity of the sleeve and the main valve cavity. The valve core seat is provided with a valve core seat through hole in communication with the vertical connecting pipe, and an aperture at an upper end of the valve core seat through hole forms the valve core valve port. A circumferential side wall of the valve core seat is provided with a valve core seat side hole in communication with the valve core seat through hole. When the refrigerant flows forwards, the valve core seat closes the main valve port to disconnect the communication between the sleeve flow passage and the valve core seat side hole, and the refrigerant flows to the valve core valve port through the sleeve flow passage. When the refrigerant flows reversely, the valve core seat moves upwards to open the main valve port, thus the valve core seat side hole comes in communication with the sleeve flow passage.

When the refrigerant flows forward, the side of the transverse connecting pipe is a high pressure zone, and the side of the vertical connecting pipe is a low pressure zone. The valve core seat moves downward under the action of a pressure difference of the refrigerant to close the main valve port. On this basis, the refrigerant enters into the inner cavity of the sleeve through the sleeve flow passage, and when the valve needle component opens the valve core valve port, the refrigerant in turn enters into the side of the vertical connecting pipe via the valve core valve port. In this process, the valve needle component may reciprocate axially with the screw rod, thereby regulating the opening of the valve core valve port, and achieving the object of flow regulation of the electronic expansion valve.

When the refrigerant flows reversely, the side of the vertical connecting pipe is a high pressure zone, and the side of the transverse connecting pipe is a low pressure zone. The valve core seat moves upward under the action of the pressure difference of the refrigerant, thereby opening the main valve port and communicating the sleeve flow passage with the valve core seat side hole. The refrigerant enters into the main valve cavity through the valve core seat through hole, the valve core seat side hole, the main valve port and the sleeve flow passage, and finally enters into the side of the transverse connecting pipe, thereby achieving the object of one-way communication of a one-way valve.

In the above operation, when the refrigerant flows forward, the valve core seat is arranged in the sleeve, and the sleeve is fixedly arranged in the main valve cavity, thus the pressure impact on the valve core seat from the high pressure refrigerant is largely borne by the sleeve, which significantly reduces the impact on the valve core seat, thereby preventing the eccentricity of the valve core seat, and avoiding an internal leakage, and ensuring the reliability of the operation of the system.

In summary, the electronic expansion valve according to the present application may prevent an excessive impact on the valve core seat caused by the refrigerant with high pressure, thereby preventing the eccentricity of the valve core seat, and avoiding an internal leakage, and ensuring the reliability of the operation of the system.

Corresponding relationships between reference numerals and components in FIGS. 1 to 3 are as follows:

| | | | |
|---|---|---|---|
| 1' | valve seat, | 1'1 | main valve cavity, |
| 1'2 | transverse connecting port, | 1'3 | vertical connecting port; |
| 1'31 | main valve port; | 2' | valve core seat, |
| 2'1 | secondary valve cavity, | 2'2 | valve core valve port, |
| 2'3 | communicating hole; | 3' | valve needle component; |
| 4'1 | transverse connecting pipe, | 4'2 | vertical connecting pipe; |
| 5'1 | screw rod, | 5'2 | nut; |
| 6'1 | coil, | 6'2 | magnet; |
| 7'1 | four-way valve, | 7'2 | outdoor heat exchanger, |
| 7'3 | first electronic expansion valve, | 7'4 | first one-way valve, |
| 7'5 | second electronic expansion valve, | 7'6 | second one-way valve, |
| 7'7 | indoor heat exchanger, and | 7'8 | compressor. |

Corresponding relationships between reference numerals and components in FIGS. 4 to 12 are as follows:

| | | | |
|---|---|---|---|
| 1 | valve seat, | 11 | main valve cavity, |
| 12 | transverse connecting port, | 13 | vertical connecting port, |
| 2 | valve core seat, | 21 | valve core valve port, |
| 22 | valve core seat sealing portion, | 23 | valve core seat through hole, |
| 231 | first axial hole, | 232 | second axial hole, |
| 233 | tapered hole, | 24 | valve core seat side hole, |
| 25 | valve core seat outer guide portion, | 3 | valve needle component, |
| 4 | sleeve, | 41 | sleeve flow passage, |
| 42 | nut inner guide hole, | 43 | nut guide holder, |
| 431 | guide inner hole, | 432 | circumferential protrusion, |
| 433 | gap, | 44 | valve core seat guide hole, |
| 441 | main valve port, | 45 | valve core seat fitting portion, |
| 51 | vertical connecting pipe, | 52 | transverse connecting pipe, |
| 61 | screw rod, | 62 | nut, and |
| 621 | lower end surface of nut. | | |

DETAILED DESCRIPTION

An object of the present application is to provide an electronic expansion valve. The structural design of the electronic expansion valve may prevent an excessive impact on a valve core seat caused by the refrigerant with high pressure when the refrigerant flows forward, thereby preventing the eccentricity of the valve core seat, and avoiding an internal leakage, and ensuring the reliability of the operation of the system.

For those skilled in the art to better understand technical solutions of the present application, the present application is described in detail in conjunction with drawings and embodiments hereinafter.

Figure 4:
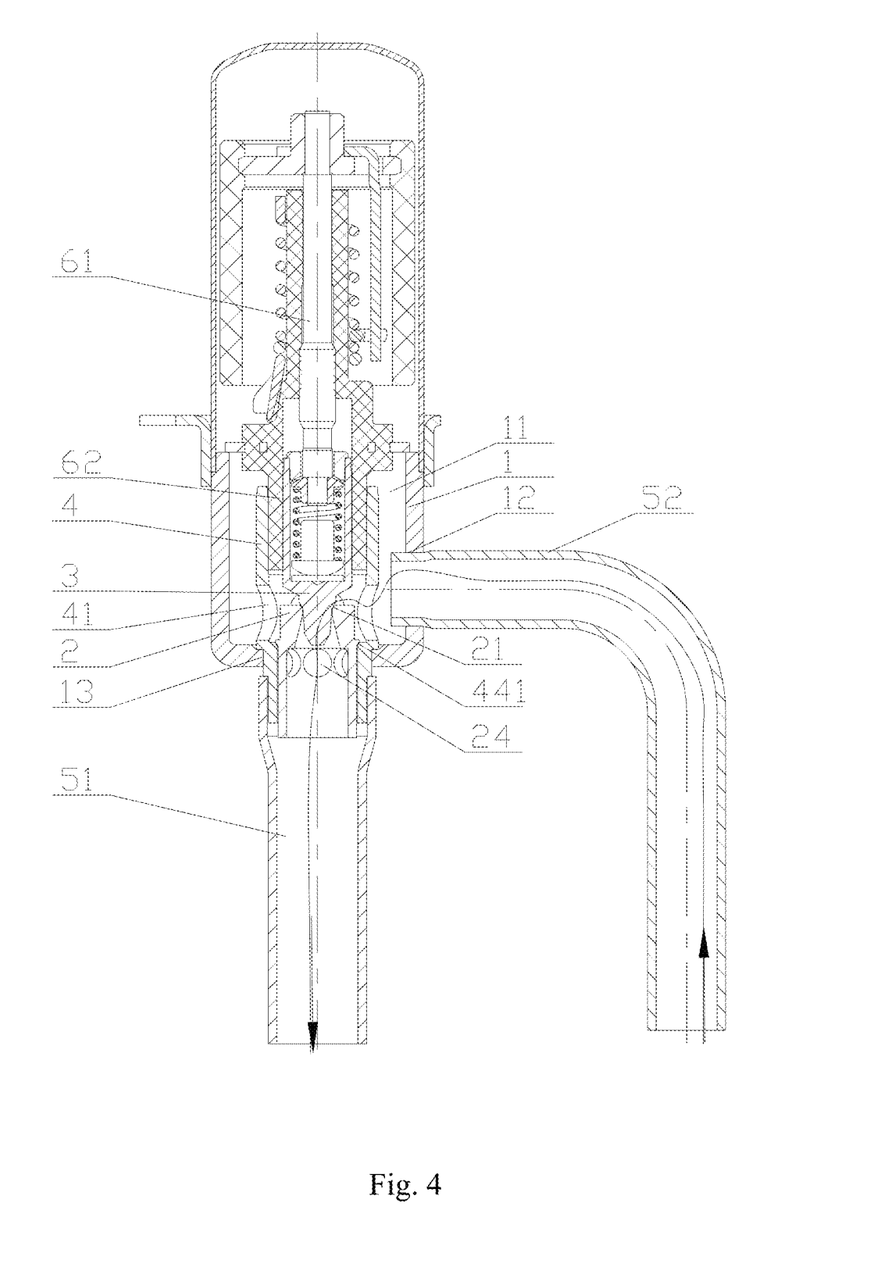
FIG. 4 is a schematic view showing the structure of an electronic expansion valve according to a first embodiment of the present application when the refrigerant flows forward.
Figure 5:
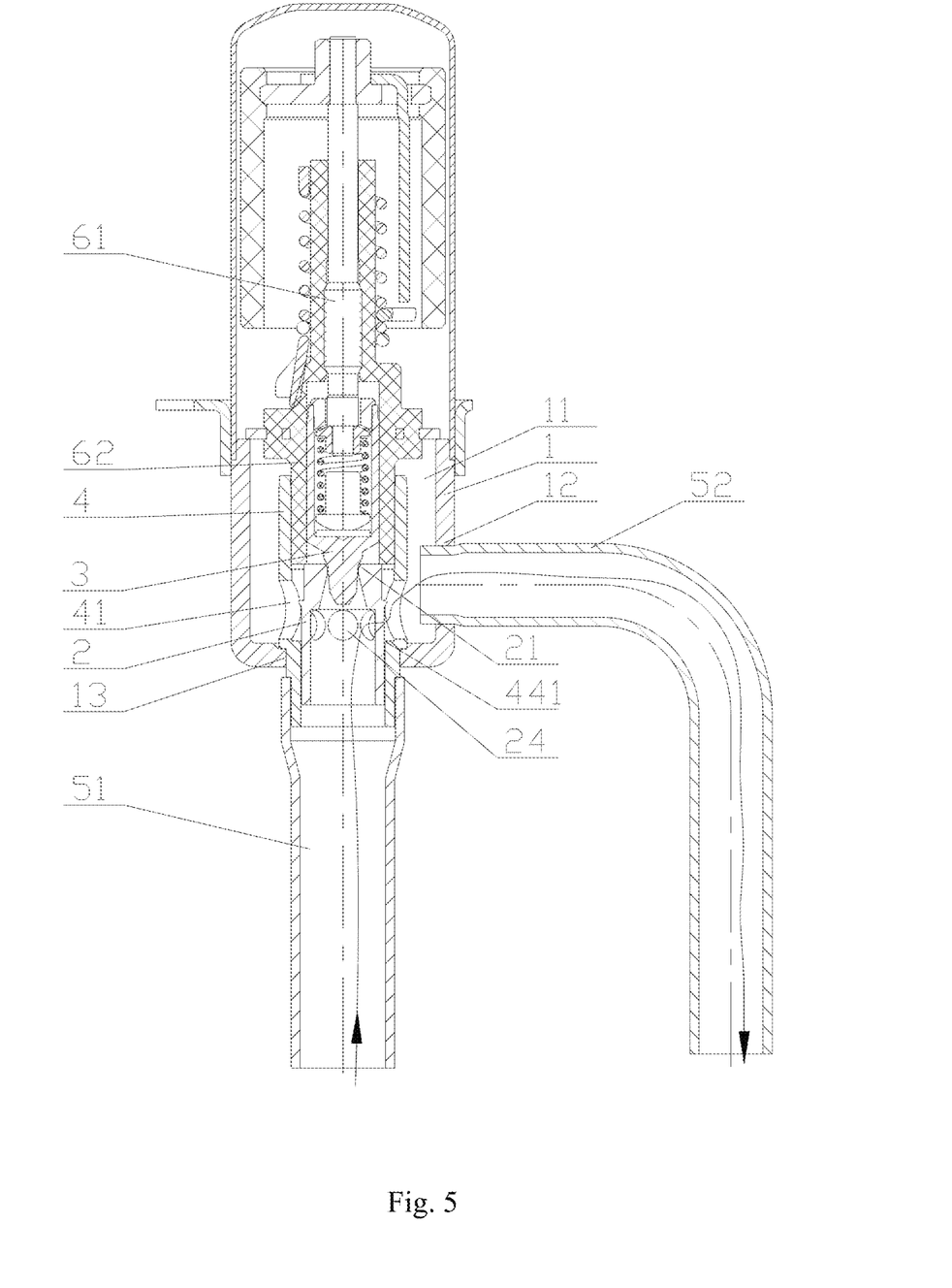
FIG. 5 is a schematic view showing the structure of the electronic expansion valve in FIG. 4 when the refrigerant flows reversely.
Figure 6:
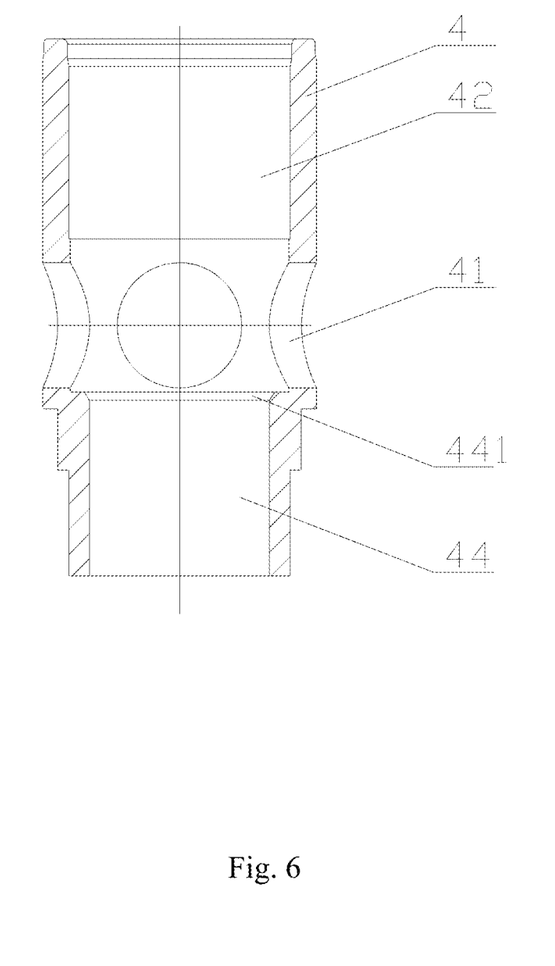
FIG. 6 is a schematic view showing the structure of a sleeve of the electronic expansion valve in FIG. 4.
Figure 7:
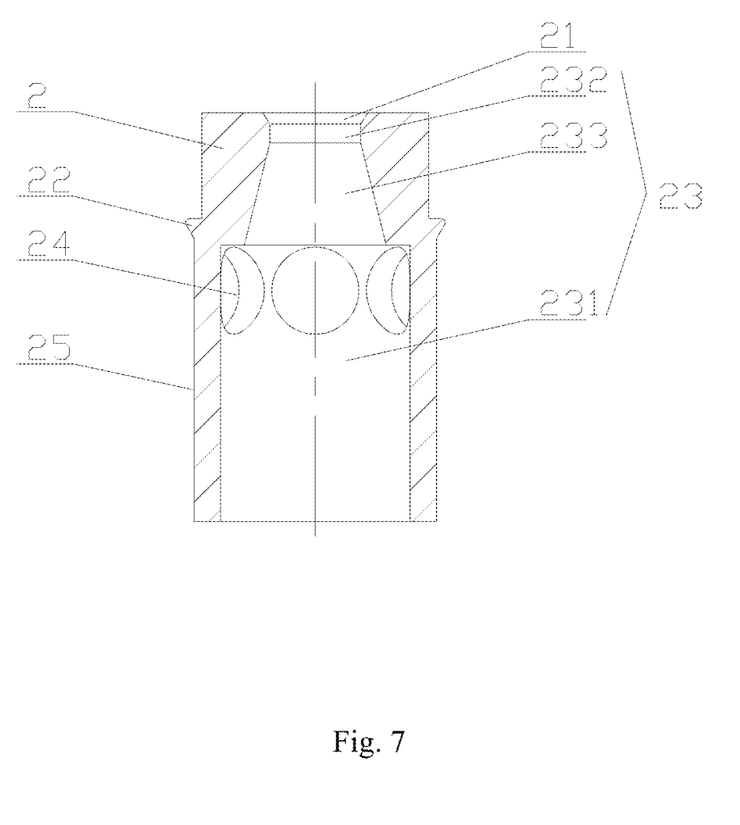
FIG. 7 is a schematic view showing the structure of a valve core seat of the electronic expansion valve in FIG. 4.

Reference is made to FIGS. 4, 5, 6 and 7. FIG. 4 is a schematic view showing the structure of an electronic expansion valve according to a first embodiment of the present application when the refrigerant flows forward; FIG. 5 is a schematic view showing the structure of the electronic expansion valve in FIG. 4 when the refrigerant flows reversely; FIG. 6 is a schematic view showing the structure of a sleeve of the electronic expansion valve in FIG. 4; and FIG. 7 is a schematic view showing the structure of a valve core seat of the electronic expansion valve in FIG. 4.

In a basic technical solution, as shown in FIGS. 4 and 5, the electronic expansion valve according to the present application includes a valve seat 1. The valve seat 1 is provided with a main valve cavity 11, a transverse connecting port 12 and a vertical connecting port 13. A transverse connecting pipe 52 is installed at the transverse connecting port 12, and a vertical connecting pipe 51 is installed at the vertical connecting port 13. The electronic expansion valve further includes a main valve port 441 in communication with the vertical connecting pipe 51, and a valve core seat 2 configured to open and close the main valve port 441. The valve core seat 2 is provided with a valve core valve port 21 which allows a communication with the vertical connecting pipe 51. The electronic expansion valve further includes a valve needle component 3 configured to open and close the valve core valve port 21. The electronic expansion valve further includes a drive component configured to drive the valve needle component 3 to move axially. The drive component includes a screw rod 61 and a nut 62 cooperating with the screw rod 61 by screw threads.

As shown in FIGS. 4 and 5, when the refrigerant flows forward, the valve core seat 2 closes the main valve port 441, the refrigerant flows to the vertical connecting pipe 51 via the valve core valve port 21, and the valve needle component 3, driven by the drive component, regulates an opening of the valve core valve port 21. When the refrigerant flows reversely, the valve core seat 2 moves upwards to open the main valve port 441, and the refrigerant flows to the transverse connecting pipe 52 via the main valve port 441.

On the basis of the above structure, as shown in FIGS. 4 and 5, a sleeve 4 is fixed in the main valve cavity 11, the valve core seat 2 is axially movably provided in the sleeve 4, and a lower portion of the valve needle component 3 extends into the sleeve 4 to open and close the valve core valve port 21. As shown in FIG. 6, a circumferential side wall of the sleeve 4 is provided with a sleeve flow passage 41 which allows a communication between an inner cavity of the sleeve 4 and the main valve cavity 11. As shown in FIG. 7, the valve core seat 2 is provided with a valve core seat through hole 23 in communication with the vertical connecting pipe 51, and an aperture at an upper end of the valve core seat through hole 23 forms the valve core valve port 21. A circumferential side wall of the valve core seat 2 is provided with a valve core seat side hole 24 in communication with the valve core seat through hole 23. When the refrigerant flows forwards, the valve core seat 2 closes the main valve port 441 to disconnect the communication between the sleeve flow passage 41 and the valve core seat side hole 24, and the refrigerant flows to the valve core valve port 21 through the sleeve flow passage 41. When the refrigerant flows reversely, the valve core seat 2 moves upwards to open the main valve port 441, thus the valve core seat side hole 24 comes in communication with the sleeve flow passage 41.

When the refrigerant flows forward, as shown in FIG. 4, the side of the transverse connecting pipe 52 is a high pressure zone, and the side of the vertical connecting pipe 51 is a low pressure zone. The valve core seat 2 moves downward under the action of a pressure difference of the refrigerant to close the main valve port 441. On this basis, the refrigerant enters into the inner cavity of the sleeve 4 through the sleeve flow passage 41, and when the valve needle component 3 opens the valve core valve port 21, the refrigerant in turn enters into the side of the vertical connecting pipe 51 via the valve core valve port 21. In this process, the valve needle component 3 may reciprocate axially with the screw rod 61, thereby regulating the opening of the valve core valve port 21, and achieving the object of flow regulation of the electronic expansion valve.

When the refrigerant flows reversely, as shown in FIG. 5, the side of the vertical connecting pipe 51 is a high pressure zone, and the side of the transverse connecting pipe 52 is a low pressure zone. The valve core seat 2 moves upward under the action of the pressure difference of the refrigerant, thereby opening the main valve port 441 and communicating the sleeve flow passage 41 with the valve core seat side hole 24. The refrigerant enters into the main valve cavity 11 through the valve core seat through hole 23, the valve core seat side hole 24, the main valve port 441 and the sleeve flow passage 41, and finally enters into the side of the transverse connecting pipe 52, thereby achieving the object of one-way communication of a one-way valve.

In the above operation, when the refrigerant flows forward, the valve core seat 2 is arranged in the sleeve 4, and the sleeve 4 is fixedly arranged in the main valve cavity 11, thus the pressure impact on the valve core seat 2 from the high pressure refrigerant is largely borne by the sleeve 4, which significantly reduces the impact on the valve core seat 2, thereby preventing the eccentricity of the valve core seat 2, and avoiding an internal leakage, and ensuring the reliability of the operation of the system.

In summary, the electronic expansion valve according to the present application may prevent an excessive impact on the valve core seat 2 caused by the refrigerant with high pressure, thereby preventing the eccentricity of the valve core seat, and avoiding an internal leakage, and ensuring the reliability of the operation of the system.

It should be noted that, as shown in FIGS. 4, 5, 6 and 7, the main valve port 441 in the present application is different from the conventional main valve port in the conventional technology as described hereinabove. In the present application, the main valve port is actually a sealing part indicated by reference numeral 441 which is formed by a tapered surface or a tapered line, and when the valve core seat sealing portion 22 seals the seal part, the communication between the sleeve flow passage 41 and the valve core seat side hole 24 is disconnected. When the valve core seat moves upward by a short distance and the valve core seat side hole 24 has not exposed yet, the seal part between the valve core seat sealing portion 22 and the main valve port 441 is opened, thus the refrigerant enters into the sleeve flow passage 41 through the valve core seat side hole 24, a gap between a valve core seat outer guide portion 25 and an inner wall of a valve core seat guide hole 44, and the main valve port 441. When the valve core seat moves upward by an enough distance that the valve core seat side hole 24 is partially or fully exposed, the refrigerant may directly flow to the sleeve flow passage 41 through the valve core seat side hole 24, and will not pass through the main valve port 441, which is different from the manner in the conventional technology that the refrigerant always has to pass through the main valve port.

In the above basic technical solution, a further improvement may be made. As shown in FIGS. 4 and 5, the lower end of the sleeve 4 is supported by the valve seat 1, and the inner wall of the sleeve 4 at the lower end forms the valve core seat guide hole 44, and an aperture of an upper portion of the valve core seat guide hole 44 forms the main valve port 441. In such structure, the main valve port 441 is formed on the inner wall of the sleeve 4, and compared to the structure of the main valve port 441 being arranged in the valve seat 1, such structure may facilitate ensuring the concentricity between the valve core seat 2 in the sleeve 4 and the main valve port 441, thereby facilitating improving the sealing performance.

Further, as shown in FIGS. 4 and 5, the vertical connecting port 13 is provided on the valve seat 1, and the lower end of the sleeve 4 extends out of the vertical connecting port 13 and is supported by the inner wall of the vertical connecting port 13. The vertical connecting pipe 51 is mounted on a circumferential outer side wall of the lower end of the sleeve 4. Such structural design, on one hand, may support the lower end of the sleeve 4, and on the other hand, may install the vertical connecting tube 51.

Further, reference is made to FIGS. 4, 5 and 7, the circumferential outer side wall of the valve core seat 2 is provided with a valve core seat outer guide portion 25 which is configured to fit in the valve core seat guide hole 44 and is guided by the valve core seat guide hole 44, and a top end of the valve core seat outer guide portion 25 protrudes outwards to form the valve core seat sealing portion 22 for opening and closing the main valve port 441. Due to the cooperation between the valve core seat outer guide portion 25 and the valve core seat guide hole 44, the valve core seat outer guide portion 25 and the valve core seat guide hole 44 may maintain a good concentricity, which in turn ensures a good concentricity between the valve core seat sealing portion 22 and the main valve port 441, thereby improving the sealing performance between the valve core seat sealing portion 22 and the main valve port 441, and preventing an internal leakage.

On the basis of the above technical solutions, a further improvement may be made to the valve core seat 2. For example, as shown in FIG. 7, the valve core seat through hole 23 includes a first axial hole 231 in communication with the vertical connecting pipe 51, and a second axial hole 232 provided above the first axial hole 231. An aperture of an upper end of the second axial hole 232 forms the valve core valve port 21. A flow area of the first axial hole 231 is larger than a flow area of the second axial hole 232. On this basis, as shown in FIG. 7, the valve core seat side hole 24 is provided on the circumferential side wall of the valve core seat 2 at a position where the first axial hole 231 is located, and is in communication with the first axial hole 231. A flow area of the valve core seat side hole 24 is larger than the flow area of the first axial hole 231. It is to be noted that, a number of the valve core seat side holes 24 may range from 4 to 6, and on this basis, "the flow area of the valve core seat side hole 24" described above refers to the total flow area of all valve core seat side holes 24.

In the above structure, the flow area of the first axial hole 231 is larger than the flow area of the second axial hole 232, and the flow area of the valve core seat side hole 24 is larger than the flow area of the first axial hole 231, thus a throttled flow of the refrigerant when flowing forward and a large-flow communication of the refrigerant when flowing reversely may be achieved.

Further, as shown in FIG. 7, the communication between the first axial hole 231 and the second axial hole 232 may be further realized via a tapered hole 233. This structural design may reduce the flow resistance of the refrigerant when flowing reversely.

In the above basic technical solution, a further improvement may be made to obtain a first embodiment of the present application. As shown in FIGS. 4, 5 and 6, the sleeve 4 is of an integral structure, and the sleeve flow passage 41 is formed by a plurality of through holes provided on the circumferential side wall of the sleeve 4. A number of the through holes may be multiple, for example may range from 4 to 6.

In the first embodiment, a further design may be made. For example, reference is made to FIGS. 4, 5 and 6, the upper portion of the sleeve 4 is provided with a nut inner guide hole 42, the sleeve 4 cooperates with a circumferential outer wall of a lower portion of the nut 62 via the nut inner guide hole 42, and the valve needle component 3 is arranged in the guide hole of the nut 62. On this basis, the nut inner guide hole 42 of the sleeve 4, a valve core guide hole and the main valve port 441 may be formed integrally, thus a good concentricity among the three structures may be maintained. On this basis, the lower portion of the nut 62 is arranged in the nut inner guide hole 42 and is guided by the nut inner guide hole 42, the valve needle component 3 is provided in the guide hole of the nut 62, and the valve core seat 2 is provided in the valve core seat guide hole 44, thus a good concentricity between the valve needle component 3 and the valve core seat 2 may be ensured, thereby ensuring a good concentricity between the valve needle component 3 and the valve core valve port 21, and improving the sealing performance between the valve needle component 3 and the valve core valve port 21.

Figure 8:
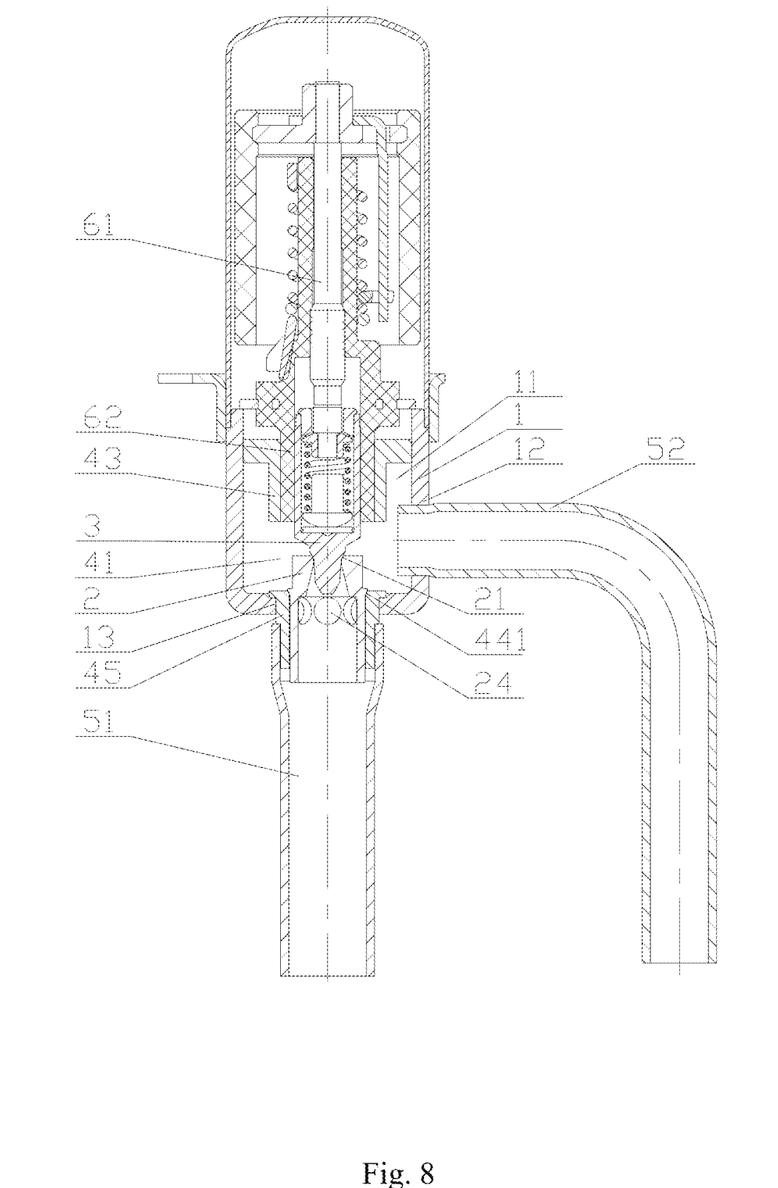
FIG. 8 is a schematic view showing the structure of an electronic expansion valve according to a second embodiment of the present application when the refrigerant flows forward.
Figure 9:
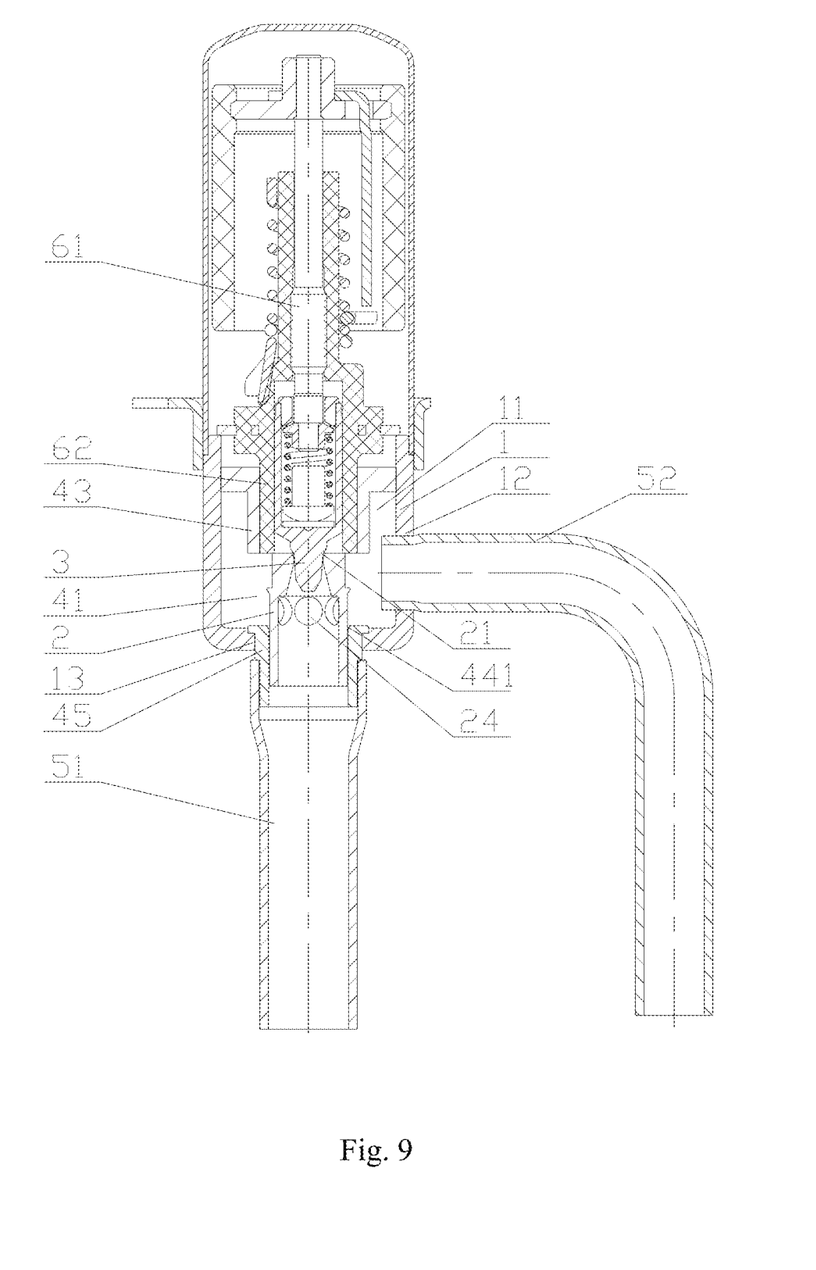
FIG. 9 is a schematic view showing the structure of the electronic expansion valve in FIG. 8 when the refrigerant flows reversely.
Figure 10:
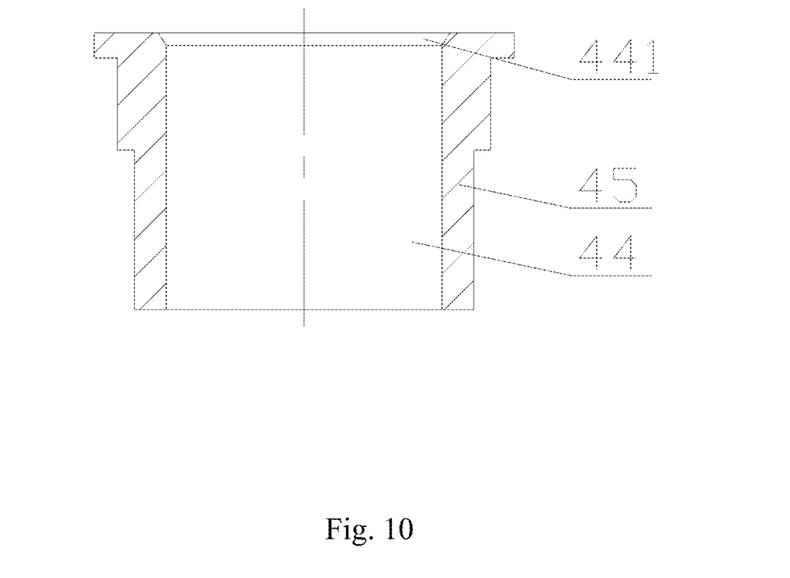
FIG. 10 is a schematic view showing the structure of a valve core seat fitting portion of a sleeve of the electronic expansion valve in FIG. 8.
Figure 11:
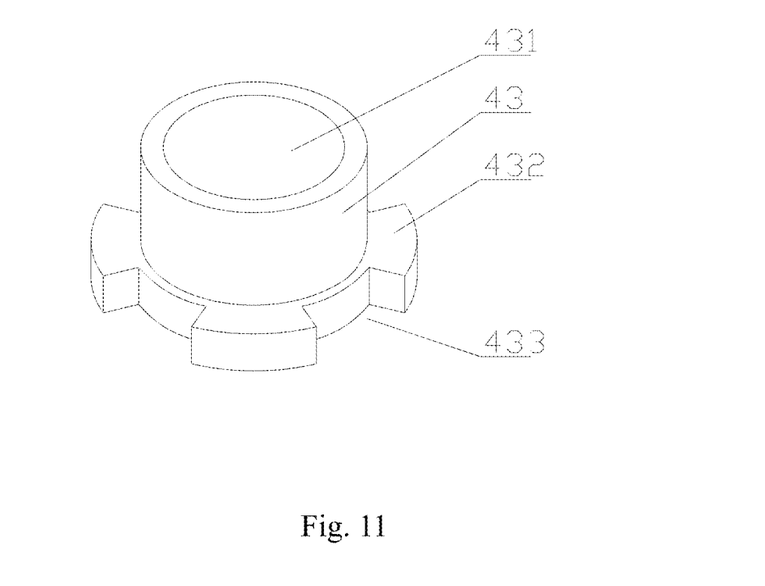
FIG. 11 is a schematic view showing the structure of a nut guide holder of the sleeve of the electronic expansion valve in FIG. 8.
Figure 12:
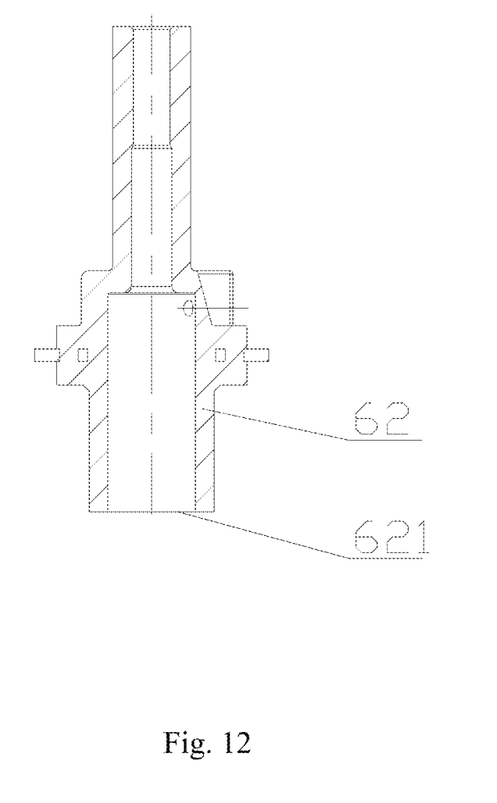
FIG. 12 is a schematic view showing the structure of a nut of the electronic expansion valve in FIGS. 4 and 8.

In the above basic technical solution, a further improvement may be made to obtain a second embodiment of the present application. Reference is made to FIGS. 8 to 12. FIG. 8 is a schematic view showing the structure of an electronic expansion valve according to the second embodiment of the present application when the refrigerant flows forward; FIG. 9 is a schematic view showing the structure of the electronic expansion valve in FIG. 8 when the refrigerant flows reversely; FIG. 10 is a schematic view showing the structure of a valve core seat fitting portion of a sleeve of the electronic expansion valve in FIG. 8; FIG. 11 is a schematic view showing the structure of a nut guide holder of the sleeve of the electronic expansion valve in FIG. 8; and FIG. 12 is a schematic view showing the structure of a nut of the electronic expansion valve in FIGS. 4 and 8.

In the second embodiment, as shown in FIGS. 8 and 9, the sleeve 4 is of a separated structure, which includes a nut guide holder 43 fixed on the inner side wall of the valve seat 1 and a valve core seat fitting portion 45 supported by the bottom wall of the valve seat 1. A gap between the nut guide holder 43 and the valve core seat fitting portion 45 in the axial direction of the valve seat 1 forms the sleeve flow passage 41. The valve core seat fitting portion 45 is provided with a positioning hole of the valve core seat 2 and the main valve port 441.

In this structural design, due to the separated structure of the sleeve 4, the gap between the nut guide holder 43 and the valve core seat fitting portion 45 in the axial direction of the valve seat 1 forms the sleeve flow passage 41, which may reduce the pressure loss of the refrigerant when flowing reversely, and reduce the processing difficulty of the sleeve 4.

Further, as shown in FIG. 11, the nut guide holder 43 is provided with a guide inner hole 431, and as shown in FIGS. 8 and 9, the lower portion of the nut 62 fits in the guide inner hole 431 and is guided by the guide inner hole 431. In addition, as shown in FIG. 11, a side wall of the guide holder is provided with a circumferential protrusion 432 configured to cooperate with the inner side wall of the valve seat 1, and the circumferential protrusion 432 is provided with a plurality of gaps 433 which may allow a communication between cavities above and below the circumferential protrusion 432. The cavities above and below the guide holder are in communication with each other via the gaps 433, thereby realizing a pressure balance of the refrigerant in the electronic expansion valve system.

In the separated structure of the sleeve 4, in order to improve the concentricity, the nut guide holder 43 and the valve core seat fitting portion 45 may be welded on the valve seat 1 firstly, and then the guide inner hole 431, the valve core seat guide hole 44 and the main valve port 441 may be machined integrally by fixing the outer circle of the valve seat 1, thereby improving the concentricity of the three holes.

Further, in the above two embodiments, a further improvement may be made. For example, a stroke of the reciprocating motion of the valve core seat 2 may be smaller than a stroke of the reciprocating motion of the valve needle component 3. On this basis, as shown in FIGS. 5, 9 and 12, when the refrigerant flows reversely, the valve core seat 2 moves upward and may be stopped when the upper end surface of the valve core seat 2 abuts against the lower end surface of the nut 62. This structural design may prevent the upper end surface of the valve core seat 2 from abutting against the valve needle component 3 when the valve core seat 2 moves upwards, and thus preventing transmitting the reverse impact to the threads of the screw rod 61, thereby avoiding reducing the lifetime of the threads of the screw rod 61.

An electronic expansion valve according to the present application is described in detail hereinbefore. The principle and the embodiments of the present application are illustrated herein by specific examples. The above description of examples is only intended to help the understanding of the method and idea of the present application. It should be noted that, for the person skilled in the art, a few of modifications and improvements may be made to the present application without departing from the principle of the present application, and these modifications and improvements are also deemed to fall into the scope of the present application defined by the claims.

The invention claimed is:

1. An electronic expansion valve, comprising a valve seat, a vertical connecting pipe and a transverse connecting pipe, the valve seat being provided with a main valve cavity; wherein the electronic expansion valve further comprises a main valve port in communication with the vertical connecting pipe and a valve core seat configured to open and close the main valve port, the valve core seat is provided with a valve core valve port which allows a communication with the vertical connecting pipe; and the electronic expansion valve further comprises a valve needle component configured to open and close the valve core valve port; and the electronic expansion valve further comprises a drive component for driving the valve needle component to move axially, and the drive component comprises a screw rod and a nut which cooperates with the screw rod by screw threads; and in a case that refrigerant flows forwards, the valve core seat closes the main valve port, the refrigerant flows to the vertical connecting pipe through the valve core valve port, and the valve needle component is driven by the drive component to regulate an opening of the valve core valve port; and in a case that the refrigerant flows reversely, the valve core seat moves upward to open the main valve port, and the refrigerant flows to the transverse connecting pipe through the main valve port, wherein a sleeve is fixed in the main valve cavity, the valve core seat is axially movably provided in the sleeve, and a lower portion of the valve needle component extends into the sleeve to open and close the valve core valve port; and a circumferential side wall of the sleeve is provided with a sleeve flow passage which allows a communication between an inner cavity of the sleeve and the main valve cavity; the valve core seat is provided with a valve core seat through hole in communication with the vertical connecting pipe, and an aperture at an upper end of the valve core seat through hole forms the valve core valve port, and a circumferential side wall of the valve core seat is provided with a valve core seat side hole in communication with the valve core seat through hole; and in a case that the refrigerant flows forward, the valve core seat closes the main valve port to disconnect a communication between the sleeve flow passage and the valve core seat side hole, and the refrigerant flows to the valve core valve port through the sleeve flow passage; and in a case that the refrigerant flows reversely, the valve core seat moves upward to open the main valve port to communicate the valve core seat side hole with the sleeve flow passage.

2. The electronic expansion valve according to claim 1, wherein a stroke of reciprocating motion of the valve core seat is smaller than a stroke of reciprocating motion of the valve needle component, and in an upward moving process of the valve core seat, the valve core seat is stopped when an upper end surface of the valve core seat abuts against a lower end surface of the nut.

3. The electronic expansion valve according to claim 1, wherein the sleeve is of an integral structure, and the sleeve flow passage is formed by a plurality of through holes provided in the circumferential side wall of the sleeve.

4. The electronic expansion valve according to claim 3, wherein an upper portion of the sleeve is provided with a nut inner guide hole, and the sleeve cooperates with a circumferential outer wall of a lower portion of the nut via the nut inner guide hole.

5. The electronic expansion valve according to claim 1, wherein the valve core seat through hole comprises a first axial hole in communication with the vertical connecting pipe and a second axial hole provided above the first axial hole, and an aperture at an upper end of the second axial hole forms the valve core valve port; and a flow area of the first axial hole is larger than a flow area of the second axial hole.

6. The electronic expansion valve according to claim 5, wherein the valve core seat side hole is provided in the circumferential side wall of the valve core seat at a position where the first axial hole is located, and is in communication with the first axial hole, and a total flow area of the valve core seat side hole is larger than the flow area of the first axial hole.

7. The electronic expansion valve according to claim 5, wherein the first axial hole and the second axial hole are further in communication with each other via a tapered hole.

8. The electronic expansion valve according to claim 1, wherein the sleeve is of a separated structure, and comprises a nut guide holder fixed on the inner side wall of the valve seat and a valve core seat fitting portion supported by a bottom wall of the valve seat; and a gap between the nut guide holder and the valve core seat fitting portion in an axial direction of the valve seat forms the sleeve flow passage.

9. The electronic expansion valve according to claim 8, wherein the nut guide holder is provided with a guide inner hole, and the lower portion of the nut is fit in the guide inner hole and is guided by the guide inner hole.

10. The electronic expansion valve according to claim 8, wherein a side wall of the nut guide holder is provided with a circumferential protrusion configured to cooperate with the inner side wall of the valve seat, and the circumferential protrusion is provided with a plurality of gaps which are configured to communicate a cavity above the circumferential protrusion and a cavity below the circumferential protrusion.

11. The electronic expansion valve according to claim 1, wherein a lower end of the sleeve is supported by the valve seat, an inner wall at a lower end of the sleeve forms a valve core seat guide hole, and an aperture at an upper portion of the valve core seat guide hole forms the main valve port.

12. The electronic expansion valve according to claim 11, wherein a circumferential outer side wall of the valve core seat is provided with a valve core seat outer guide portion which is fit in the valve core seat guide hole and is guided by the valve core seat guide hole, and a top end of the valve core seat outer guide portion protrudes outwards to form a valve core seat sealing portion for opening and closing the main valve port.

13. The electronic expansion valve according to claim 11, wherein the sleeve is of an integral structure, and the sleeve flow passage is formed by a plurality of through holes provided in the circumferential side wall of the sleeve.

14. The electronic expansion valve according to claim 11, wherein a vertical connecting port is provided in the valve seat, and the lower end of the sleeve extends out of the vertical connecting port and is supported by an inner wall of the vertical connecting port.

15. The electronic expansion valve according to claim 14, wherein the vertical connecting pipe is further mounted on a circumferential outer side wall of the lower end of the sleeve.

16. The electronic expansion valve according to claim 11, wherein the valve core seat through hole comprises a first axial hole in communication with the vertical connecting pipe and a second axial hole provided above the first axial hole, and an aperture at an upper end of the second axial hole forms the valve core valve port; and a flow area of the first axial hole is larger than a flow area of the second axial hole.

17. The electronic expansion valve according to claim 16, wherein the valve core seat side hole is provided in the circumferential side wall of the valve core seat at a position where the first axial hole is located, and is in communication with the first axial hole, and a total flow area of the valve core seat side hole is larger than the flow area of the first axial hole.

18. The electronic expansion valve according to claim 11, wherein the sleeve is of a separated structure, and comprises a nut guide holder fixed on the inner side wall of the valve seat and a valve core seat fitting portion supported by a bottom wall of the valve seat; and a gap between the nut guide holder and the valve core seat fitting portion in an axial direction of the valve seat forms the sleeve flow passage.

19. The electronic expansion valve according to claim 18, wherein the nut guide holder is provided with a guide inner hole, and the lower portion of the nut is fit in the guide inner hole and is guided by the guide inner hole.

20. The electronic valve according to claim 18, wherein a side wall of the nut glide holder is provided with a circumferential protrusion configured to cooperate with the inner side wall of the valve seat, and the circumferential protrusion is provided with a plurality of gaps which are configured to communicate a cavity above the circumferential protrusion and a cavity below the circumferential protrusion.

\* \* \* \* \*